United States Patent [19]

Hertrich

[11] Patent Number: 4,572,460
[45] Date of Patent: Feb. 25, 1986

[54] MEANS FOR PULLING TAPE FROM A REEL

[75] Inventor: Friedrich R. Hertrich, Boulder, Colo.

[73] Assignee: Digital Equipment Corporation, Maynard, Mass.

[21] Appl. No.: 579,776

[22] Filed: Feb. 13, 1984

[51] Int. Cl.⁴ .......................... G03B 1/04; G11B 15/32
[52] U.S. Cl. ..................................... 242/195; 226/92; 352/235
[58] Field of Search .................... 242/192, 195, 197; 226/91, 92; 352/235, 78 R; 360/95, 137; 354/345

[56] References Cited

U.S. PATENT DOCUMENTS

| | | | |
|---|---|---|---|
| 1,655,297 | 1/1928 | Thornton | 352/235 X |
| 2,606,409 | 8/1952 | Gordon | 352/235 |
| 3,136,464 | 6/1964 | Schmid | 226/91 |
| 3,153,516 | 10/1964 | DeLoof et al. | 242/195 |
| 3,706,423 | 12/1972 | Neff | 242/195 |
| 4,090,680 | 5/1978 | Karsh | 242/195 |
| 4,110,774 | 8/1978 | Krehbiel et al. | 354/345 |
| 4,244,640 | 1/1981 | Aldrich et al. | 352/130 |

FOREIGN PATENT DOCUMENTS 272140  6/1927  United Kingdom ............... 352/235

Primary Examiner—Leonard D. Christian
Attorney, Agent, or Firm—William E. Cleaver

[57] ABSTRACT

The present arrangement includes a first tape leader which can be readily and automatically coupled to a second tape leader. In a preferred embodiment the first tape leader is connected to be wound on a take up reel while the second tape leader is connected to a tape to be pulled from a supply reel. The first tape leader has one end formed into a mushroom like tab with a supporting stem. The second tape leader has a locking aperture at one end thereof which is proportioned so that a wide section thereof can fit over said mushroom like tab while a narrow section thereof will accept the stem but block passage of the mushroom tab therethrough. Accordingly when the tab is passed through the wide section and the leader is moved (pulled) toward the narrow section of the locking aperture, the tab and part of the stem become locked in the narrow section. Hence the leaders are locked, or buckled, to enable the first tape leader to pull the second leader. The first and second tape leaders each have a smoothing aperture therein which provides a means to accept the bumps created by buckling the tab into the locking aperture so that the wrapped around leaders are in a smooth configuration when pulling a tape.

1 Claim, 4 Drawing Figures

MEANS FOR PULLING TAPE FROM A REEL

BACKGROUND

In tape handling devices it is necessary to have a reel which is "taking up," or winding, the tape which is being pulled from a supply reel. Very often, in the prior art, the take up reel and the supply reel are interchangeable, depending on which way the tape is being driven. In such an arrangement both reels are often located in one housing, a cassette, and there is no need to "start," or load, a tape onto a take up reel.

However there are some applications in the prior art where the supply reel is provided as an entity unto itself and the tape thereon is pulled therefrom by an "empty" take up reel. A film on a motion picture projector is a typical example of the last mentioned prior art arrangement. Other uses of this kind are well known. In the prior art, with such arrangements, there has always been a certain amount of human factor involved. For instance in a movie projector arrangement, the film is threaded along a group of sprocketed drivers and idlers. In some other arrangements the tape is pulled from the supply reel and "grabbed" by a vacuum port on the take up reel. In another arrangement the tape is pulled from the supply reel and hand loaded into a take up reel whereat there is a sheath, which, in response to movement of the take up reel, operates to squeeze the tape and hold it in position while the tape winds on itself.

The present arrangement provides two tape leaders which are designed to be automatically, and readily, locked, or buckled, together. In my co-pending patent application entitled, "A Mechanism for Joining Tape Leaders", Ser. No. 06/578,766, filed Feb. 13, 1984, I teach and claim a mechanism to be used with the two tape leaders described and claimed in the present patent application.

SUMMARY

In the present arrangement there is included a first tape leader which in a preferred embodiment is identified with the take up reel. The first tape leader is formed at one end to have an enlarged tab which is supported by a stem portion. The other end of the first tape leader is formed to be fastened to a take up reel so that when the take up reel is wound the first tape leader will wind on itself. In addition in the present arrangement there is included a second tape leader which in a preferred embodiment is identified with a supply reel. The second tape leader is formed to have a locking aperture at one end and a means to be secured to a tape to be pulled at the other end. The locking aperture is designed to have a relatively wide section through which the enlarged tab can pass, or be pushed. In addition the locking aperture has a relatively narrow section which will not pass the enlarged tab but which will accept the stem portion. Accordingly when the tab is passed through the locking aperture it can be moved toward the narrow section (the stem being permitted to move through the narrow section) until the enlarged tab bumps into the sides of the narrow section thus locking the first tape leader with the second tape leader. At the point, or area, where the enlarged tab is locked by the narrow section there are extensions, or bumps, on either side of the second tape leader. In order to effect a smooth wrap around of the two leaders, (so that a distortion of the tape does not result from winding the tape from the supply reel around locked leaders having bumps), the two leaders are provided with smoothing apertures. The smoothing apertures are located, one each in respectively said first and second tape leaders, such that the extensions, or bumps, are fitted into the smoothing apertures and hence the wrap around of the leaders is smooth. The take up reel leader has a locating aperture in close proximity to the enlarged tab so that the mechanism described in my co-pending application, mentioned above, or some other tool can be used to position the take up leader for automatic coupling to said supply reel tape leader.

The objects and features of the present invention can be better understood in view of the following description taken in conjunction with the drawings, wherein.

Figure 1:
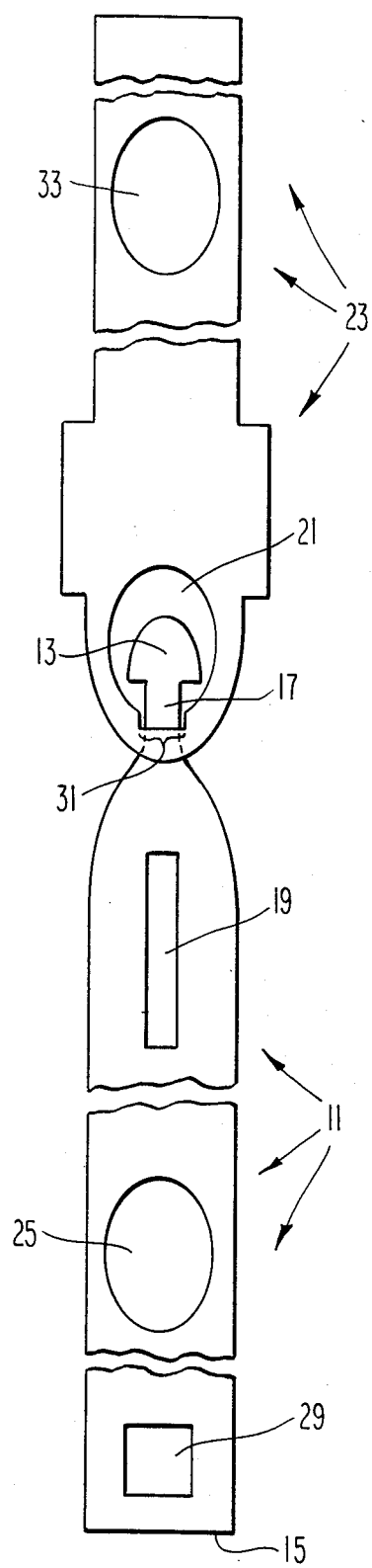
FIG. 1 is a view which depicts the enlarged tab of the first leader being initially moved through the wide section of the locking aperture.

Consider FIG. 1. In FIG. 1 there is shown a tape leader 11 which is broken into sections to simplify the drawing. Actually the leader 11 is one continuous piece of material from the enlarged tab 13 to the end 15. As can be seen in FIG. 1, one end of the tape leader 11 is formed into an enlarged tab 13 which is supported by a stem portion 17. The enlarged tab in a preferred embodiment is shaped to closely resemble a mushroom. Other shapes could be used.

Figure 3:
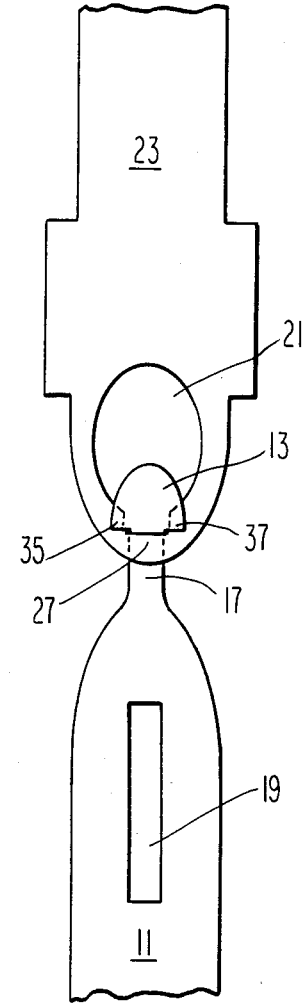
FIG. 3 is a view which shows the enlarged tab in the locked position in the narrow section of the locking aperture.

In close proximity to the enlarged tab 13 there is formed a locating aperture 19. The locating aperture 19 is used to enable a tool (such as the type mentioned in my corresponding application, above) to be inserted therein so that the enlarged tab 13 can be moved into a position to be readily (and automatically) pushed through the locking aperture 21 of the supply reel leader 23. Also within the take up reel leader 11 there is formed a first smoothing aperture 25. When the enlarged tab 13 is in the locked position, as shown in FIG. 3, the stem 17 bulges out from the supply reel tape leader 23. The bump resulting from the above described bulging occurs in the region 27 (FIG. 3) of the tape leader 23, but away from viewer looking at FIG. 3. In addition when the enlarged tab 13 is in the locked position, as shown in FIG. 3, the enlarged tab 13 extends out from locking aperture 21, toward the viewer looking at FIG. 3. The bump resulting at section 27 fits into the smoothing aperture 25 when the take up reel leader 11 is wrapped around the take up reel.

Finally there is formed a securing aperture 29 formed in close proximity to the second end 15 of the tape leader 11. The securing aperture 29 permits the leader 11 to be fastened to the take up reel so that the tape leader 11 moves with the take up reel.

As can be further gleaned from FIG. 1 the locking aperture 21 is formed to have a wide section through which the enlarged tab 13 can pass. In addition the locking aperture 21 has a narrow section 31. The narrow section 31 is wide enough to permit the stem 17 to pass therethrough but is narrow enough to block the enlarged tab 13 from passing therethrough. In the tape leader 23 there is also formed a smoothing aperture 33.

As mentioned above the enlarged tab 13 extends away from locking aperture when the two leaders are locked as shown in FIG. 3. The smoothing aperture 33 accepts the enlarged tab 13 when the two leaders are wrapped around the take up reel. The foregoing is better appreciated from FIG. 4 which will be discussed hereinafter.

Figure 2:
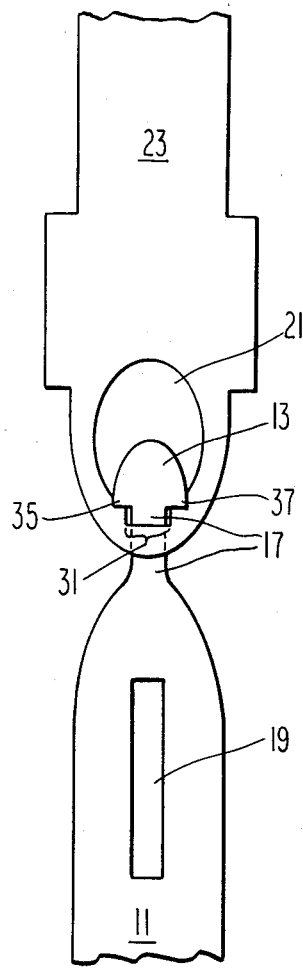
FIG. 2 is a view which shows the relationship of the enlarged tab as it moves to be locked by the narrow section.

If we examine FIGS. 1, 2 and 3 the lock up procedure can be readily understood. In FIG. 1 the initial position is shown where the enlarged tab 13 is located opposite the wide portion of the locking aperture 21. The enlarged tab 13 is pushed (by a cam or otherwise) well into the locking aperture 21. Thereafter, as shown in FIG. 2, the take up reel leader is pulled in the direction of rotation of the take up reel. To say it another way the tab 13 is moved toward the narrow section 31. In this intermediate step the extensions 35 and 37 slide over the sides of the locking aperture near the narrow section 31 and hence the tab 13 becomes locked in. As the tape leader 11 is moved further in the direction of rotation of the take up reel the tab 13 becomes firmly locked with the leader 23 as depicted in FIG. 3.

Figure 4:
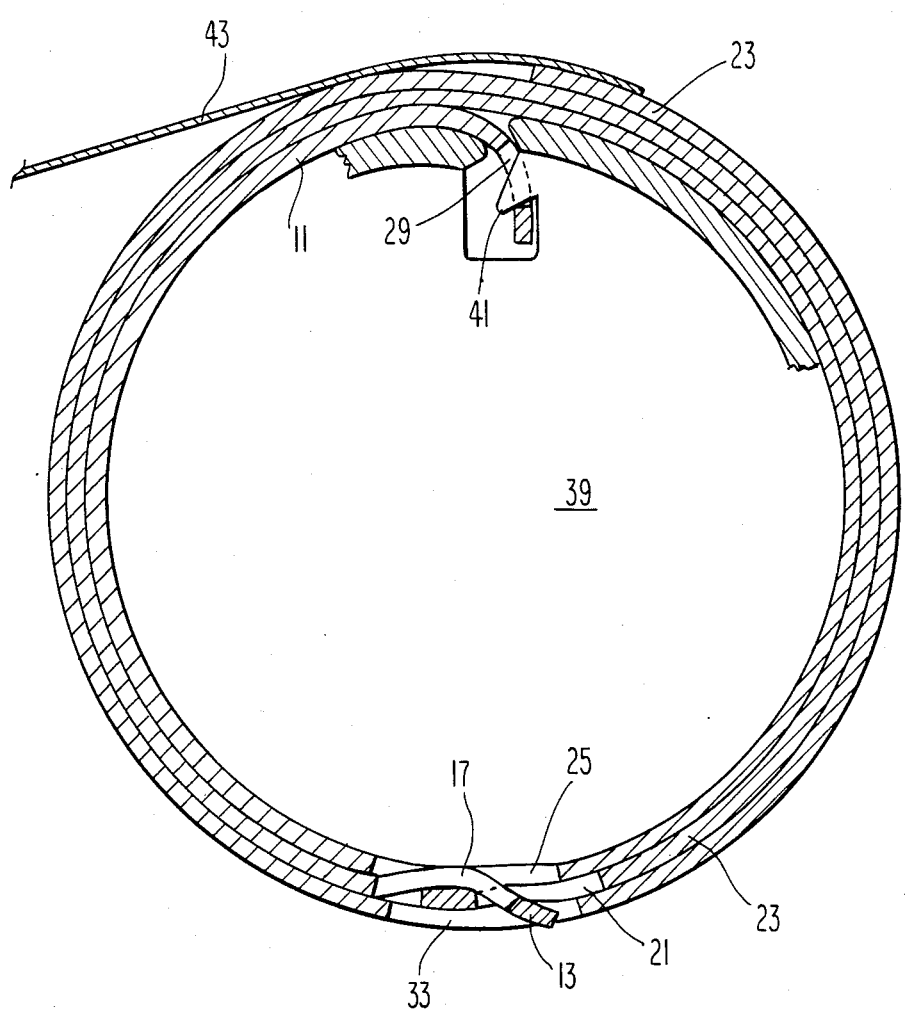
FIG. 4 is a side, partially cross-sectioned, view of the two leaders wrapped on a take up reel.

FIG. 4 shows a side view, partially sectionalized, of the two leaders wrapped around the take up reel 39. In FIG. 4 the aperture 29 is shown secured to a finger 41. If the leader 11 is followed around the wrapped position the smoothing aperture 25 can be seen. As can be recognized in FIG. 4 the bump created by the stem 17 (as described above) is shown fitting into the smoothing aperture 25. If the tape leader 11 is followed around the second layer, the extension of the tab 13 into the locking aperture 21 becomes apparent. If the leader 23 is followed around becoming layer 3 the smoothing aperture 33 is recognized. As can be seen in FIG. 4, the extension, or bump, formed by the tab 13 fits into the smoothing aperture 33. As can be gleaned from FIG. 4 the two leaders 11 and 23 are wrapped around the take up reel 39 in a smooth fashion.

As can be further gleaned from FIG. 4 the tape to be pulled, tape 43 is secured to the leader 23 by adhesive material such as rubberized adhesive or the like. Other forms of adhesive or other forms of securing the tape 43 to the leader 23 can be used.

The present arrangement of the two tape leaders, formed as described above enables a means to pull a tape to be automatically coupled to a tape to be pulled. In a preferred embodiment the tape leaders are fabricated from a polyester material and are approximately 0.004 to 0.010 mils thick. Other materials and thicknesses may be used.

I claim:

1. Means for enabling a take up reel to pull tape from a supply tape reel comprising in combination: take up leader means to be coupled to said take up reel, said take up leader means having first and second ends and formed to have an enlarged section supported by a relatively narrow stem section at said first end, said take up leader means further formed to have a first smoothing aperture therein which first smoothing aperture lies between said first end and said second end such that when said take up leader means is wrapped around said take up reel said stem section lies substantially in said first smoothing aperture and said take up leader further formed to have a locating aperture disposed in close proximity to said first end whereby in response to a tool being inserted in said locating aperture said enlarged section can be held in position to be passed through a locking aperture and said take up leader further formed to have a securing aperture located in close proximity to said second end whereby said take up leader can be readily secured to said take up reel; supply tape leader means to be connected to tape on said supply tape reel, said supply tape leader means having first and second end and formed to have a locking aperture at said first end, said supply tape leader means further formed to have securing means at said second end to be secured to said tape on said supply tape reel, said locking aperture formed to have a first section which is wide enough to pass over said enlarged section while being further formed to have a narrow section which can accept said stem section while blocking passage of said enlarged section therethrough whereby in response to passing said enlarged section through said first section of said locking aperture and moving said enlarged section toward said narrow section, said stem section and said enlarged section become locked with said narrow section, said supply tape leader means further formed to have a second smoothing aperture therein disposed between said locking aperture and said second end of said supply tape leader means whereby when said supply tape leader means is wrapped on said take up reel around said take up leader means said enlarged section lies substantially in said second smoothing aperture to effect a smooth wrapping of said supply tape leader means and said take up leader means when tape is pulled from said supply tape reel onto said take up reel.

* * * * *